US012698857B2

(12) United States Patent
Wasetzki

(10) Patent No.: US 12,698,857 B2
(45) Date of Patent: Aug. 4, 2026

(54) COUPLING

(71) Applicant: Georg Fischer Rohrleitungssysteme AG, Schaffhausen (CH)

(72) Inventor: Maxim Wasetzki, Singen (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 39 days.

(21) Appl. No.: 18/894,637

(22) Filed: Sep. 24, 2024

(65) Prior Publication Data

US 2025/0122963 A1     Apr. 17, 2025

(30) Foreign Application Priority Data

Oct. 12, 2023     (EP) ..................................... 23203216

(51) Int. Cl.
| | |
|---|---|
| *F16L 37/373* | (2006.01) |
| *F16L 37/084* | (2006.01) |
| *F16L 37/12* | (2006.01) |
| *F16L 37/26* | (2006.01) |

(52) U.S. Cl.
CPC ......... *F16L 37/373* (2013.01); *F16L 37/0847* (2013.01); *F16L 37/12* (2013.01); *F16L 37/26* (2013.01); *F16L 2201/20* (2013.01)

(58) Field of Classification Search
CPC ..... F16L 37/373; F16L 37/0847; F16L 37/26; F16L 37/12; F16L 2201/20
See application file for complete search history.

(56) References Cited

U.S. PATENT DOCUMENTS

| | | | | | |
|---|---|---|---|---|---|
| 2,948,553 | A | * | 8/1960 | Gill ........................ | F16L 37/373 137/614.02 |
| 3,159,180 | A | * | 12/1964 | Courtot .................. | F16L 37/373 137/614.06 |
| 3,382,892 | A | * | 5/1968 | Cerbin .................. | F16L 37/373 285/70 |
| 4,438,779 | A | * | 3/1984 | Allread ................. | F16L 37/113 285/85 |
| 5,090,449 | A | * | 2/1992 | Fournier ............... | F16L 37/373 137/637.05 |
| 5,099,883 | A | * | 3/1992 | Maiville ............... | F16L 37/373 285/87 |
| 5,332,001 | A | * | 7/1994 | Brown .................... | F16L 37/36 251/96 |
| 8,132,781 | B2 | * | 3/2012 | Haunhorst ............ | F16L 37/373 251/149.9 |

(Continued)

FOREIGN PATENT DOCUMENTS

| | | |
|---|---|---|
| WO | 2010-125442 A1 | 11/2010 |
| WO | 2019-233578 A1 | 12/2019 |

*Primary Examiner* — Craig M Schneider
*Assistant Examiner* — Christopher D Ballman
(74) *Attorney, Agent, or Firm* — Harness, Dickey & Pierce, P.L.C.

(57) ABSTRACT

A fluid coupling containing two coupling halves coupled to one another via connecting elements. Each of the coupling halves containing a housing which has an end face. The end face having at least one connecting element for the mutual connection of the coupling halves. The housing having connecting faces of the two coupling halves contacting one another when in the coupled state. A spherical valve element and a locking element, which can be mutually operated via the connecting elements and releases a rotary lever for operating the valve element.

11 Claims, 4 Drawing Sheets

(56) References Cited

U.S. PATENT DOCUMENTS

| | | | | |
|---|---|---|---|---|
| 8,887,762 B2 * | 11/2014 | Densel | .................... | F16L 37/36 |
| | | | | 251/149.9 |
| 8,967,177 B2 * | 3/2015 | Haunhorst | .............. | F16L 37/36 |
| | | | | 137/614.01 |
| 9,010,722 B2 * | 4/2015 | Hoots | .................. | F16K 1/2007 |
| | | | | 70/180 |
| 9,341,294 B2 * | 5/2016 | Wong | .................... | F16K 5/0647 |
| 11,867,333 B2 * | 1/2024 | Hamkens | .............. | F16L 37/373 |
| 11,879,581 B2 * | 1/2024 | Koller | .................... | F16L 37/36 |
| 12,193,419 B2 * | 1/2025 | Jankiewicz | .......... | A01K 63/045 |
| 12,385,587 B2 * | 8/2025 | Ohara | .................. | F16L 37/373 |
| 2010/0269933 A1 * | 10/2010 | Haunhorst | .............. | F16L 37/36 |
| | | | | 137/614.06 |
| 2021/0239250 A1 * | 8/2021 | Hamkens | .............. | F16L 37/373 |

* cited by examiner

COUPLING

CROSS-REFERENCE TO RELATED APPLICATIONS

This application is based on, and claims priority from European Patent Application No. 23203216.9, filed on Oct. 12, 2023, the disclosure of which is incorporated herein by reference in its entirety.

FIELD OF THE INVENTION

The invention relates to a fluid coupling containing two coupling halves that can be coupled to one another via connecting elements, each of the coupling halves containing: a housing, which has an end face, the end face having at least one connecting element for the mutual connection of the coupling halves, the housing having an end-face connecting face, the connecting faces of the two coupling halves contacting one another when in the coupled state; a spherical valve element; a locking element, which can be mutually operated via the connecting elements and releases rotary levers; and a rotary lever for operating the valve element.

BACKGROUND OF THE INVENTION

Fluid couplings ensure a sealed medium connection between two coupling halves that connect hoses and pipes to one another. Some fluid couplings contain valves in the coupling halves, which selectively block the medium connection in order to prevent medium flowing through the coupling when the coupling is not in engagement with the complementary coupling half, in order to avoid undesirable escape of the medium.

Such fluid couplings are known from WO2010/125442 A1. They usually have a housing in which a valve element, usually in the form of a ball valve, is arranged and is selectively rotatable between a closed position in which the valve element obstructs the passageway and an open position in which the valve element does not obstruct the passageway. To prevent inadvertent disconnection of the fluid coupling, such fluid couplings have a blocking function. This means that when the valve elements are open, the two coupling halves cannot be disconnected from one another. In addition, it is not possible to open the valve elements when the coupling halves are not connected to one another for fluid coupling; in this case the valve elements are always in the closed position.

WO2019/233578 A1 also discloses such a fluid coupling.

SUMMARY OF THE INVENTION

The aforementioned fluid couplings have a high level of complexity with many individual parts for separate safety mechanisms and are therefore time- and cost-intensive to produce and in particular to assemble.

An aspect of the invention is to propose a fluid coupling that is simple and cost-effective in construction and production and still meets all the safety criteria of a fluid coupling.

This aspect is achieved according to the invention in that the locking element is arranged in the housing such that it can be displaced parallel to the throughflow direction or longitudinal axis, wherein the locking element is displaced parallel to the throughflow direction, and the rotary lever is thereby released, by the coupling halves hooking into one another vertically relative to the throughflow direction or longitudinal axis.

The fluid coupling according to the invention contains two coupling halves that can be coupled to one another via connecting elements. The two couplable coupling halves are preferably identical. Each of the coupling halves contains a housing, preferably consisting of plastic. The housing has an end face, the end face having at least one connecting element for the mutual connection of the coupling halves. The housing has an end-face connecting face, the connecting faces of the two coupling halves contacting one another when in the coupled state. The coupling half according to the invention also has a spherical valve element; a locking element, which can be mutually operated via the connecting elements and releases rotary levers; and a rotary lever for operating the valve element. The locking element is arranged in the housing such that it can be displaced parallel to the throughflow direction or longitudinal axis, wherein the locking element is displaced parallel to the throughflow direction or longitudinal axis, and the rotary lever is released, by the coupling halves hooking into one another vertically relative to the throughflow direction or longitudinal axis.

It has been found advantageous that the connecting element can be hooked into a flange projection of the opposing coupling half in order to connect the coupling halves. It is advantageous when the connecting element and the flange projection are arranged integrally on the end face of the housing. It has also been found advantageous when the connecting element is arranged on one half of the end face, and the flange projection is arranged on the other half of the end face. For example, the flange projection is arranged on the upper half of the end face, and the connecting element is arranged on the lower half of the end face, or vice versa. The coupling halves can thereby be connected to one another point-symmetrically.

Preferably, the connecting element is designed as a half-shell. The two coupling halves can thereby be connected by being displaced vertically onto one another.

Preferably, the coupling halves still have securing elements to avoid inadvertent detachment before the rotary levers are operated. It is advantageous when the securing elements are arranged on both sides of the housing and snap into one another as soon as the coupling halves are joined and in the end position. It is advantageous when the coupling halves can be disconnected from one another by operating the securing elements, preferably by briefly suppressing the spring force in the securing elements and displacing the securing element out of the snapped-in position.

A preferred embodiment consists in that the half-shell-shaped connecting element has a wrap angle of 150-180°. This allows an exact, form-fitting, mutual positioning of the two coupling halves relative to one another. By means of this type of connection technology, a mutual rotation of the two coupling halves, like in a bayonet closure, can also be avoided, which allows a simpler installation in a pipeline and still forms a secure connection.

Preferably, the half-shell-shaped connecting element extends along the edge of one half of the end face. The coupling halves can thereby be pushed into one another.

It is advantageous when the connecting element has a sliding face running obliquely or in an inclined manner to the vertical and acts therewith on a sliding face on the locking element in order to displace the locking element parallel to the throughflow direction or longitudinal axis. The sliding face on the connecting element is inclined to a plane running vertically to the longitudinal axis in order to achieve a constant displacement of the locking element parallel to the longitudinal axis during the vertical hooking-in process of the two coupling halves. This is achieved in that the inclined sliding face of the connecting element constantly contacts the sliding face of the locking element during the vertical hooking-in process and displaces the locking element in the horizontal direction owing to the inclination of the sliding face of the connecting element.

It is advantageous when a vertical hooking-in process of the two coupling halves triggers a horizontal unlocking process of the locking elements and releases the rotary levers.

It has been found advantageous when the connecting element can be hooked into the locking element. Preferably, the oblique sliding face on the connecting element engages into the locking element via the sliding face on the locking element and pulls it forwards counter to a restoring spring action, thereby unlocking the rotary lever by releasing the rotary movement. This is achieved preferably in that the locking element is displaced parallel to the longitudinal axis, and a stop on the rotary lever is no longer blocked.

It has been found to be an advantageous embodiment when a displaceable actuation element is arranged in the rotary lever, wherein the actuation element can be operated by means of the locking element. It is advantageous when the locking element is displaced parallel to the longitudinal axis via the sliding face of the connecting element, and the locking element pushes the vertically displaceable actuation element upwards into the rotary lever and thereby releases the rotary lever. It has been found advantageous when a spring force or a spring element acts on the actuation element, and this is compressed with the aid of the locking element via the actuation element in order to push the actuation element upwards and release the rotary lever.

It has been found advantageous when a catch system is arranged on the housing in order to lock the rotary lever in place. It is particularly preferred when the rotary lever can be locked in place in the completely open position. This is preferably achieved by locking the actuation element in place into a recess in the housing in the valve open position. For this purpose, a spring force preferably acts on the actuation element, which spring force attempts to press the actuation element out of the rotary lever and into the original position and is also overcome when the locking element is pressed in during connection of the two coupling halves.

Preferably, the catch system is formed by at least one recess in the housing, into which recess the actuation element engages. It has been found advantageous when different rotary lever positions can be locked in place; the fluid coupling can thereby be locked in place in different opening states.

All the design options can be combined freely with one another.

BRIEF DESCRIPTION OF THE DRAWINGS

An exemplary embodiment of the invention is described using the figures, but the invention is not limited only to the exemplary embodiment. In the figures.

4

Figure 3:
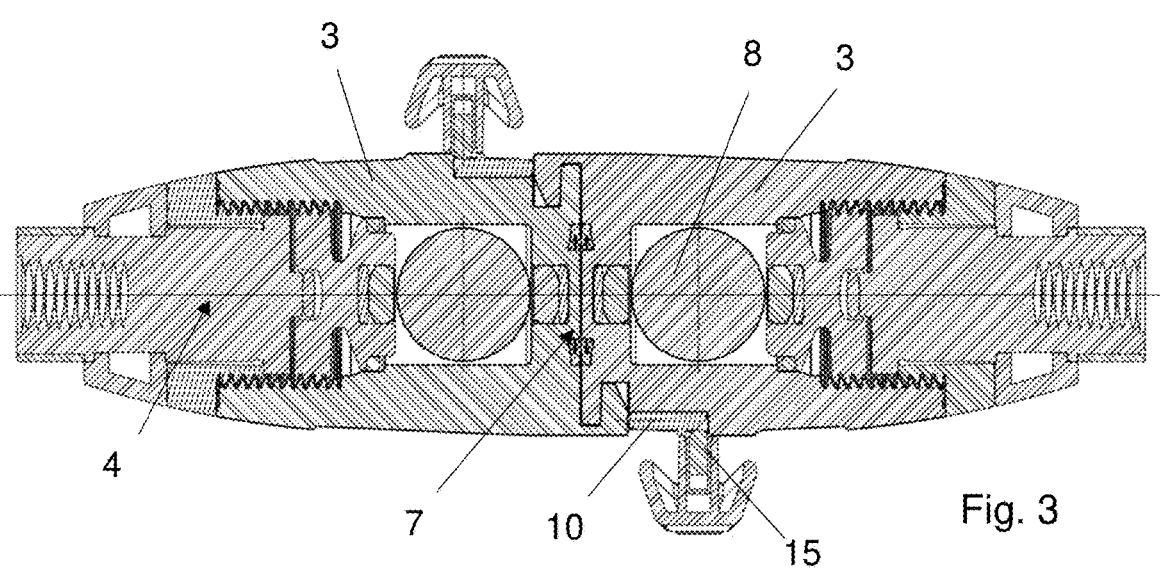
Figure 4:
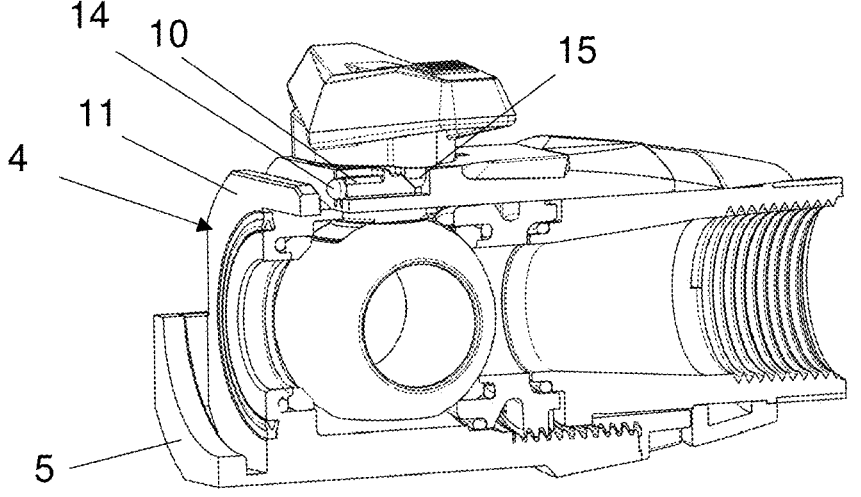
Figure 4A:
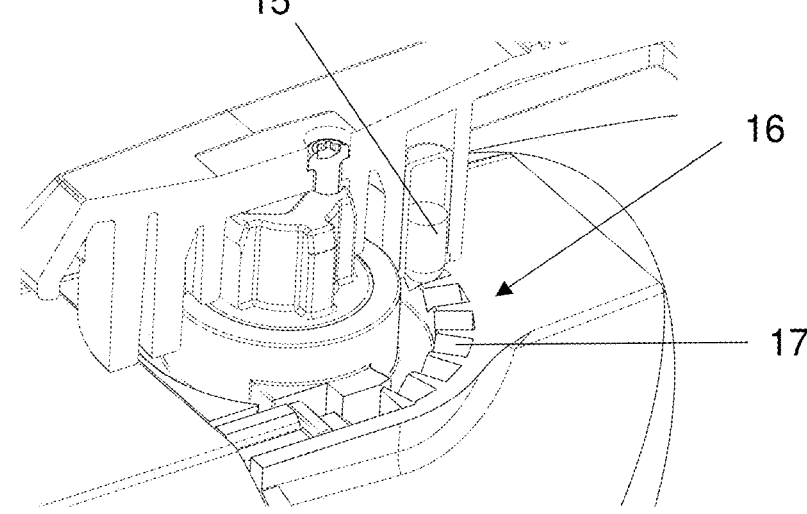
Figures 5, 6, 7:
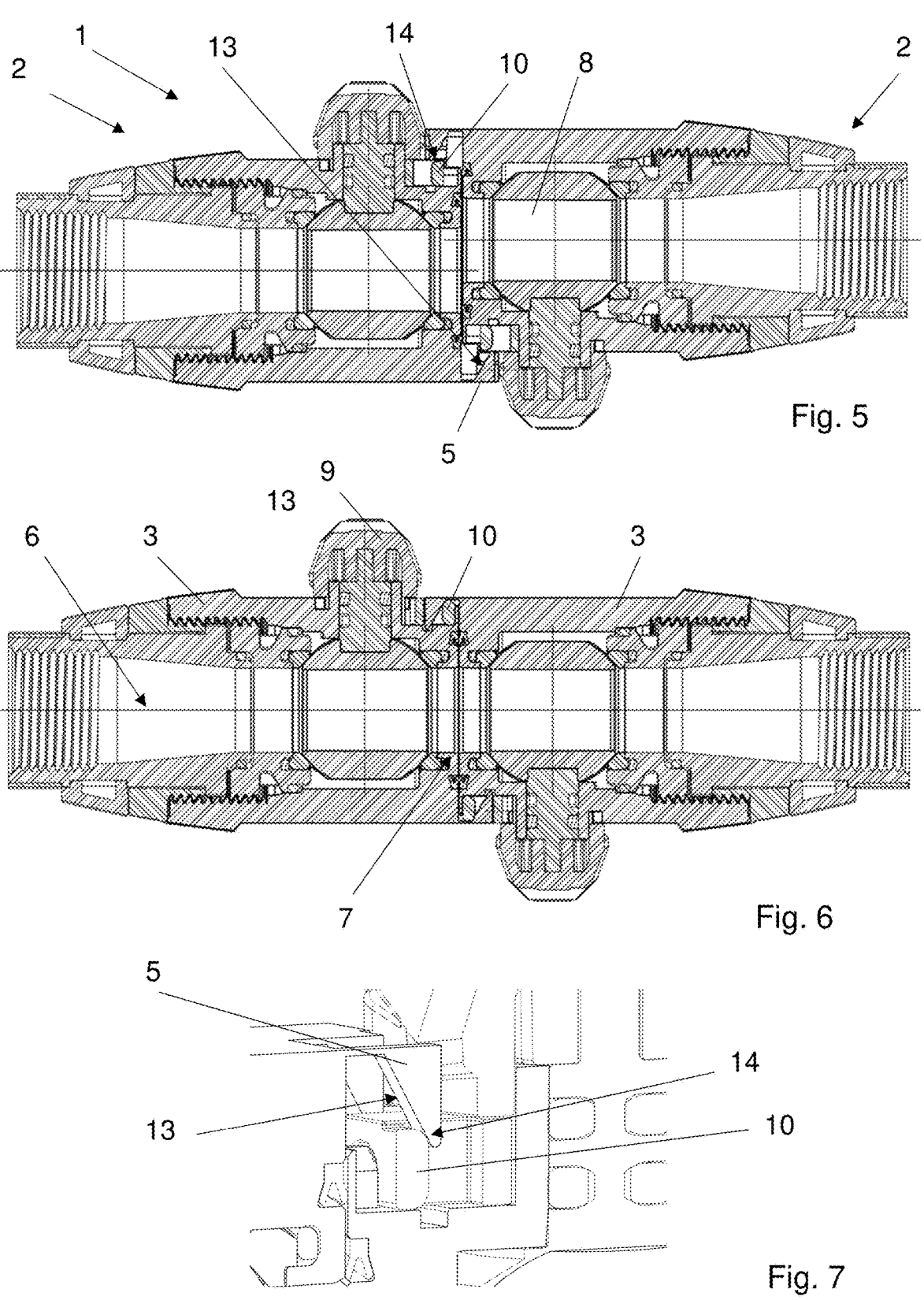

FIG. 3 shows a longitudinal section, offset from the centre axis, through a coupled fluid coupling according to the invention, with locking element variant I, FIG. 4 shows a three-dimensional cut-away view of a coupling half of a fluid coupling according to the invention, with locking element variant I, FIG. 4a shows a three-dimensional partially cut-away view of a coupling half in the rotary lever region of a fluid coupling according to the invention, with locking element variant I, FIG. 5 shows a longitudinal section, along the centre axis, through a fluid coupling according to the invention, just as the coupling halves are being connected, with locking element variant II, FIG. 6 shows a longitudinal section, along the centre axis, through a coupled fluid coupling according to the invention, with locking element variant II, and FIG. 7 shows a three-dimensional view of the locking element variant II.

EXEMPLARY EMBODIMENTS

Figures 1A, 1B:
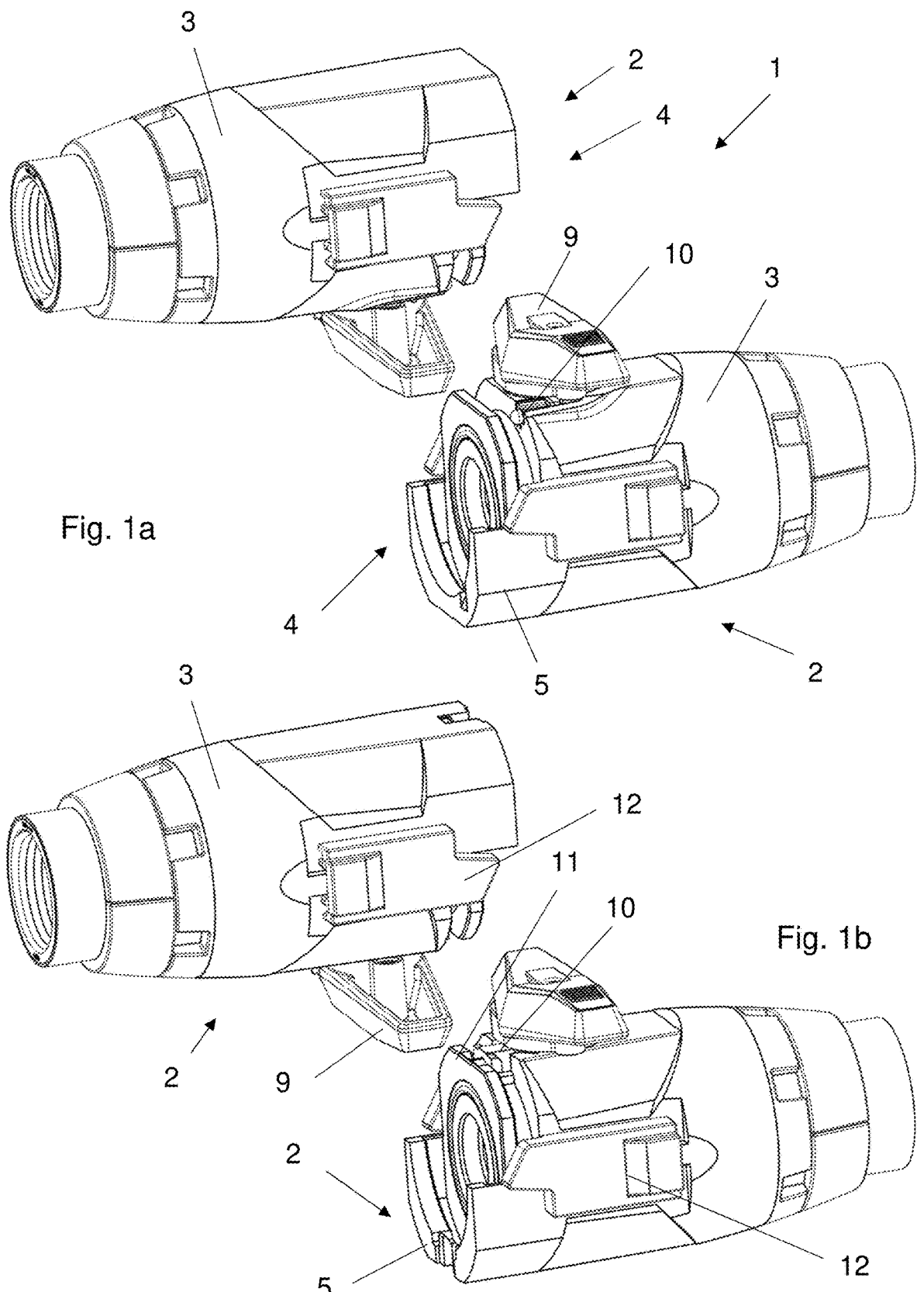
FIG. 1a shows a fluid coupling according to the invention not yet connected, with variant I as the locking elements.
FIG. 1b shows a fluid coupling according to the invention not yet connected, with variant II as the locking elements.

The drawings shown in FIGS. 1a and b show a three-dimensional view of two coupling halves 2, which are joined to form a fluid coupling 1. The coupling halves are identical and oppose one another point-symmetrically when in the assembled state. A coupling half 2 has a housing 3, preferably consisting of plastic. A connecting element 5 is integrally arranged on the end face 4 of the housing 3. This connecting element is used for the mutual hooking in of the coupling halves 2 vertically towards the longitudinal axis 6. The coupling halves 2 are connected to one another in that, as shown in FIGS. 1a and b, they are moved vertically towards one another, and the connecting elements 5 engage in a flange projection 11 of the opposing coupling half 2, or the flange projection 11 is enclosed by the connecting element 5. The connecting element 5 is preferably half-shell-shaped and surrounds the flange projection preferably by 150-180°. Preferably, the half-shell-shaped connecting element 5 extends along the edge of the end face 4 on one half. The flange projection 11 is arranged on the other or opposite half of the end face 4, whereby the two identical coupling halves can be connected to one another point-symmetrically. In the connected state, the connecting faces 7 of the two coupling halves 2 bear tightly against one another; this can be seen easily in FIGS. 3 and 6. So that the coupling halves 2 do not inadvertently detach from one another after connection and before operation of the rotary levers, the coupling halves 2 preferably have securing elements 12 on the outside of the housing. It is advantageous when each coupling half 2 has two securing elements 12 on both sides of the housing circumference, and these securing elements snap into one another when the coupling halves 2 are coupled. Preferably, the securing elements 12 have spring elements (not shown), which generate preloading, and the fluid coupling 1 can be disconnected again only when the securing elements 12 are pressed back.

Figure 2:
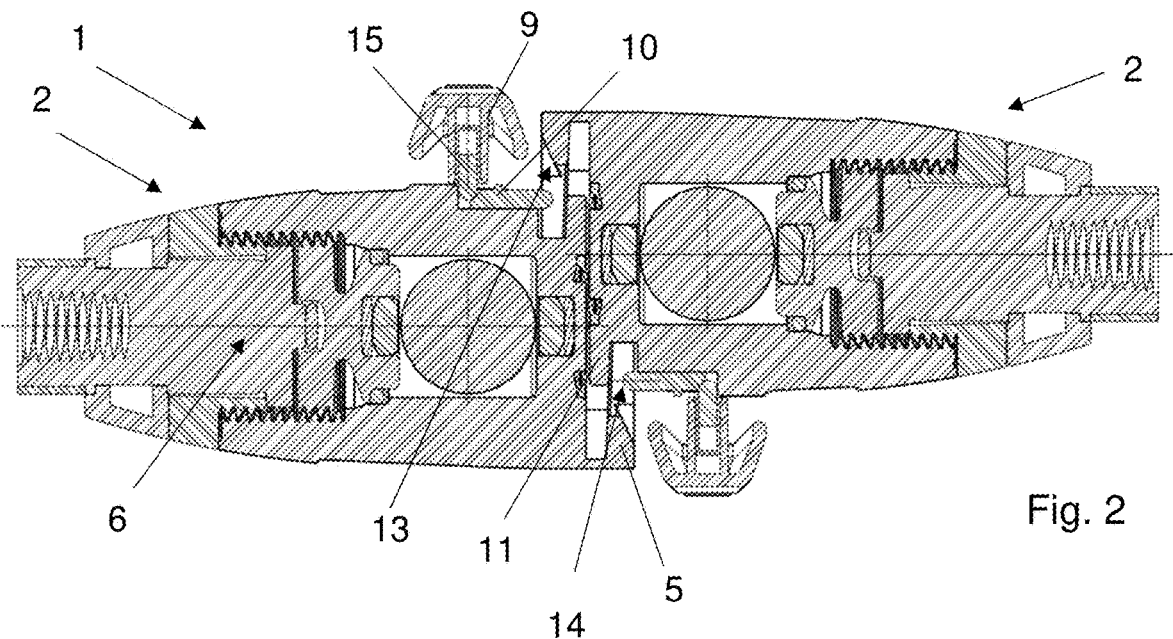
FIG. 2 shows a longitudinal section, offset from the centre axis, through a fluid coupling according to the invention, just as the coupling halves are being connected, with locking element variant I.

The two coupling halves 2 have a spherical valve element 8, which can be operated via the rotary lever 9. The rotary lever 9 is secured via a locking element 10 so that it can be operated only when the coupling halves 2 are connected to one another. When the coupling halves 2 are separate or in a state disconnected from one another, the valve body is always in the closed position and cannot be operated by the rotary lever, or the rotary lever 9 cannot be operated. When the two coupling halves 2 are joined to form a fluid coupling 1, the locking element 10 is displaced in the coupling half 2 such that the rotary lever 8 is released. In the embodiments shown, two variants of locking system are shown, although further variants are also conceivable. FIG. 1*a* shows variant I, and FIG. 1*b* shows variant II of the locking system in the coupling halves 2, and FIG. 2-4 show variant I, and FIG. 5-7 show variant II. When the coupling halves 2 are joined, the locking element 10 is displaced via a sliding face 13 of the connecting element 5, which sliding face is oblique or inclined to the vertical. The sliding face 13 of the connecting element 5 contacts the sliding face 14 of the locking element 10, which is preferably preloaded via a spring element (not shown) and blocks the rotary lever 9. The locking element 10 is arranged in the housing 3 such that it can be displaced parallel to the longitudinal axis 6. During the process of vertically coupling the two coupling halves 2, the locking element 10 is displaced parallel to the longitudinal axis 6 or throughflow direction counter to the spring action, and the rotary lever 9 is released to rotate. Because of the oblique sliding face 13 on the connecting element 5, insertion into the locking element 10 can be centred easily, and because of the oblique profile or the widening in the axial direction, the locking element is displaced parallel to the longitudinal axis. Variant I shows an embodiment in which the locking element 10 acts on an actuation element 15 that is vertically displaceable in the rotary lever 9. It can be seen easily in FIG. 2 that, before the locking element 10 is pressed back by means of the sliding face 13 of the connecting element 5, the actuation element 15 in the rotary lever protrudes into the housing 3, and the operation of the rotary lever 9 is not possible as a result. FIG. 3 shows when the fluid coupling 1 is joined together and the locking element 10 presses the actuation element 15 upwards into the rotary lever 9, and the rotary lever 9 can be operated as a result. FIG. 4 shows this again in a three-dimensional cut-away view when the rotary lever 9 is still blocked. Variant II shows a locking element 10 that is pushed forwards with the engagement of the sliding face 13 of the connecting element 5. FIG. 5 shows the locking element 10 still in the blocked position with the sliding face 13 shortly before engagement. FIG. 6 shows the locking element 10 in the position in which the rotary lever is released. FIG. 7 shows a three-dimensional detail of the locking element 10 of variant II shortly before the sliding face 13 touches the sliding face 14 of the locking element 10 and the locking element 10 is then thereby displaced parallel to the longitudinal axis. It has been found advantageous when a catch system 16 is arranged on the coupling halves 2. Preferably, the open position of the coupling halves 2 can be locked in place so that the opening state cannot change inadvertently. It has also been found that it is specifically preferred when there are multiple catch positions, as a result of which the position of the fluid coupling can be locked in place in different positions. It has been found advantageous when recesses 17 are provided on the housing 3 for this purpose, as can be seen well in FIG. 4*a*. Because of the preloaded actuation element 15 (spring element that acts on the actuation element, not shown), it engages in a recess 17 arranged on the housing and prevents inadvertent shifting of the position of the fluid coupling.

The invention claimed is:

1. Fluid coupling comprising two coupling halves configured to be coupled to one another in a vertical direction via connecting elements, each of the coupling halves containing: a housing, which has an end face, the end face having at least one connecting element for the mutual connection of the coupling halves, the housing having an end-face connecting face, the connecting faces of the two coupling halves contacting one another when in the coupled state; a spherical valve element; a locking element, which is configured to be mutually operated via the connecting elements and releases rotary levers; and a rotary lever for operating the valve element, wherein the locking element is configured in the housing such that it is displaced parallel to the throughflow direction or longitudinal axis to release the rotary element when the coupling halves are hooked into one another vertically relative to the through flow direction or longitudinal axis.

2. Fluid coupling according to claim 1, wherein the connecting element is configured to be hooked into a flange projection of the opposing coupling half in order to connect the coupling halves.

3. Fluid coupling according to claim 1, wherein the connecting element is designed as a half-shell.

4. Fluid coupling according to claim 3, wherein the half-shell-shaped connecting element has a wrap angle of 150-180°.

5. Fluid coupling according to claim 3, wherein the half-shell-shaped connecting element extends along the edge of one half of the end face.

6. Fluid coupling according to claim 1, wherein the connecting element has a sliding face running obliquely or in an inclined manner to the vertical and acts therewith on a sliding face on the locking element in order to displace the locking element parallel to the throughflow direction or longitudinal axis.

7. Fluid coupling according to claim 1, wherein a vertical hooking-in process of the two coupling halves triggers an unlocking process, which is horizontal or parallel to the longitudinal axis, of the locking elements and releases the rotary levers.

8. Fluid coupling according to claim 1, wherein the connecting element is configured to be hooked into the locking element.

9. Fluid coupling according claim 1, wherein a displaceable actuation element is arranged in the rotary lever, wherein the actuation element is configured to be operated by means of the locking element.

10. Fluid coupling according claim 1, wherein a catch system is arranged on the housing in order to lock the rotary lever in place.

11. Fluid coupling according to claim 10, wherein the catch system is formed by at least one recess in the housing, into which recess the actuation element engages.

* * * * *